United States Patent [19]
Chang

[11] Patent Number: 5,457,842
[45] Date of Patent: Oct. 17, 1995

[54] PORTABLE EYEGLASSES WIPER

[76] Inventor: Kun S. Chang, 3F., No. 6, Alley 1, Lane 148, Min Chuan Rd., Lu Chou Hsiang, Taipei Hsien, Taiwan

[21] Appl. No.: 304,916

[22] Filed: Sep. 13, 1994

[51] Int. Cl.⁶ ................................................. G02C 13/00
[52] U.S. Cl. ................................................. 15/214; 15/244.3
[58] Field of Search ................................. 15/118, 209.1, 15/210.1, 214, 218, 218.1, 220.3, 220.4, 223, 244.3

[56] References Cited

U.S. PATENT DOCUMENTS

| | | | |
|---|---|---|---|
| 1,548,913 | 8/1925 | Simpson | 15/214 |
| 2,055,314 | 9/1936 | Seburger | 15/214 |
| 2,819,484 | 1/1958 | Fouse | 15/220.3 |
| 2,908,923 | 10/1959 | Schlechter | 15/118 |
| 3,149,663 | 9/1964 | Comet | 15/220.3 |
| 4,480,352 | 11/1984 | Eggett | 15/220.3 |
| 4,854,449 | 8/1989 | Fitzhugh | 15/214 |

FOREIGN PATENT DOCUMENTS

| | | | |
|---|---|---|---|
| 246509 | 8/1963 | Australia | 15/220.3 |
| 806980 | 1/1959 | United Kingdom | 15/214 |

Primary Examiner—Mark Spisich
Attorney, Agent, or Firm—Pro-Techtor International

[57] ABSTRACT

The present invention is a portable eyeglasses wiper. It consists primarily of a pair of tongs and two wiping components. The pair of tongs is V-shaped and each of its two opening ends is a round head. The center of the round head has a joint, which has a joint flange on each of its two sides. Each wiping component consists of a shell seat, which has a soft pad on its top (for example, sponge). The soft pad is wrapped by a piece of wiping cloth. The excessive edge of the cloth is tucked into the space of the bottom of the shell seat. Then, a fixed disc is placed into the space. The fixed disc has a rectangular hole in the center. It enables the wiping component to attach to the inner and outer surfaces of the eyeglasses or sunglasses for wiping. The wiper is portable, too. Therefore, the present invention is very practical.

5 Claims, 3 Drawing Sheets

PORTABLE EYEGLASSES WIPER

BACKGROUND OF THE INVENTION

1. (a) Field of the Invention

The present invention relates to a portable wiper, more particularly to a portable wiper for eyeglasses and sunglasses.

2. (b) Description of the Prior Art

A piece of cloth for wiping eyeglasses is used widely by optometries as a gift to consumers.

Existing eyeglasses wiping cloth is a simple structure. It is a rectangular shaped wiping cloth for consumers to wipe their eyeglasses. The characteristic of this structure helps accomplish the wiping function. However, it has many disadvantages that need to be addressed. Its disadvantages are listed as follows for reference:

[1] Consumers tend to forget to bring along their eyeglasses wiping cloths. Therefore, they use tissue paper or pull up a corner of their clothes to wipe their eyeglasses. It does not help clean their eyeglasses thoroughly. Worse still, it can easily scratch the eyeglasses which would damage the eyes after a certain period of time.

[2] Wiping cloth's pile remains on the eyeglasses after wiping.

[3] After some time, the wiping cloth cannot accomplish the job of wiping. It has to be washed to be used again. However, it is made impossible to be used anymore by the process of washing and drying.

Due to the above reasons, the inventor has attempted to work for a new design that would overcome the shortages of the existing eyeglasses wiping cloths. After continuous attempts and tests, the present invention, a portable eyeglasses wiper, is successfully designed to overcome all the disadvantages of traditional eyeglasses wiping cloths.

SUMMARY OF THE INVENTION

The main object according to the present invention is to provide a portable eyeglasses wiper. A ring is attached to the wiper's pair of tongs which can be hooked to the strap of a handbag or a belt loop of a pair of pants. It provides convenience to a consumer and has the feature of portability and thus the advantage of practicability.

Another object according to the present invention is to provide a low-cost portable eyeglasses wiper that can be disposed of after a period of time.

BRIEF DESCRIPTION OF THE DRAWINGS

The drawings disclose an illustrative embodiment of the present invention which serves to exemplify the various advantages and objects hereof, and are as follows:

FIG. 2A is the fragmented sectional view of the wiping component of the present invention.

DETAILED DESCRIPTION OF THE PREFERRED EMBODIMENT

Figure 1:
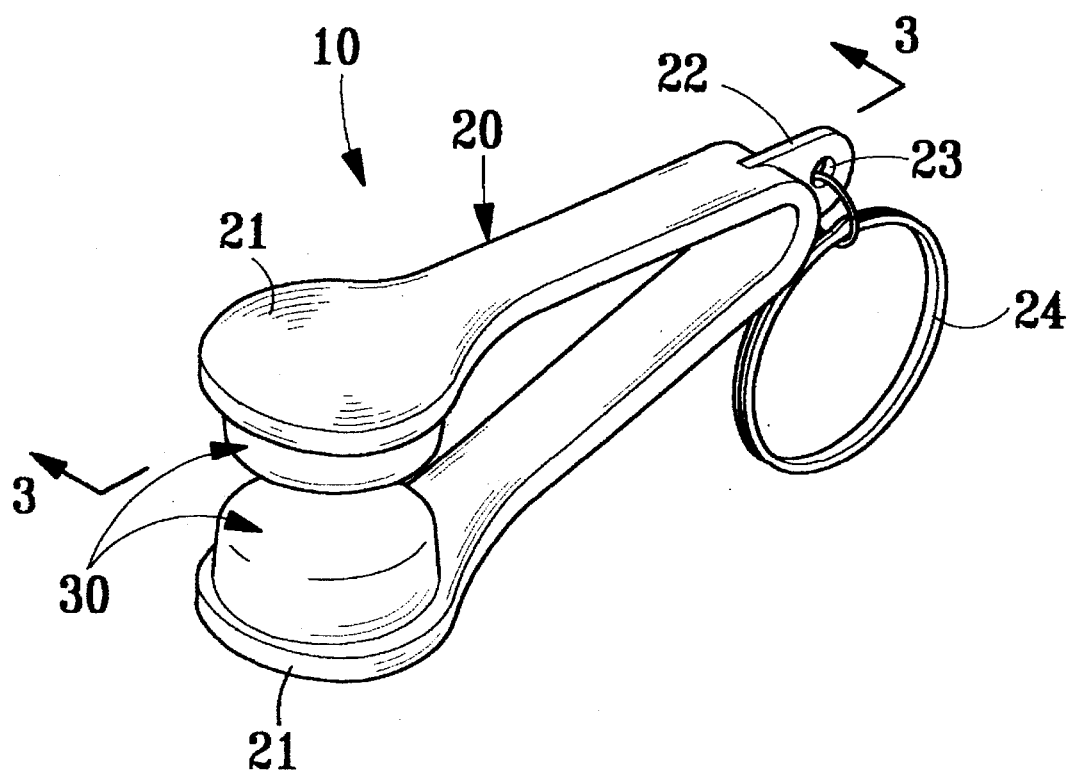
FIG. 1 is a perspective view of the present invention.
Figure 2:
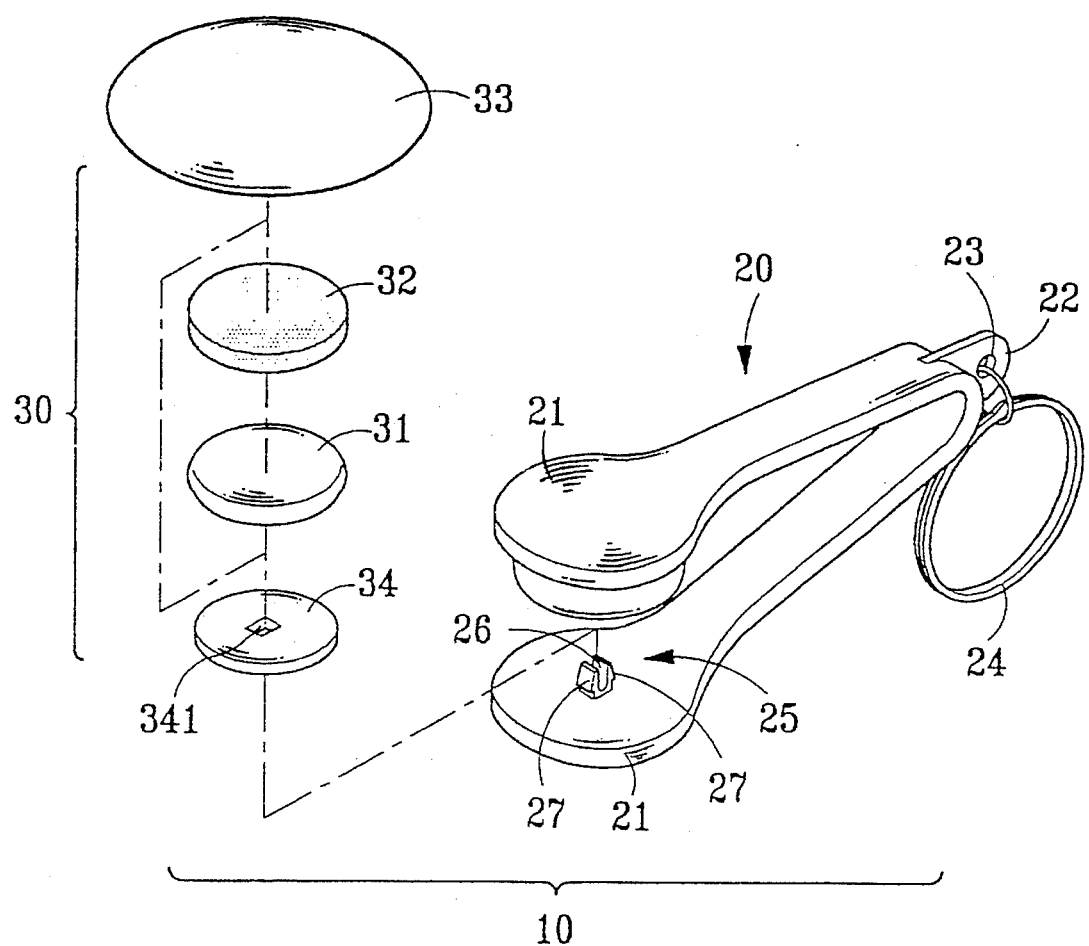
FIG. 2 is an exploded view of the present invention.
Figure 2:
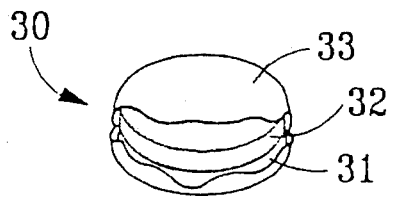
Figure 3:
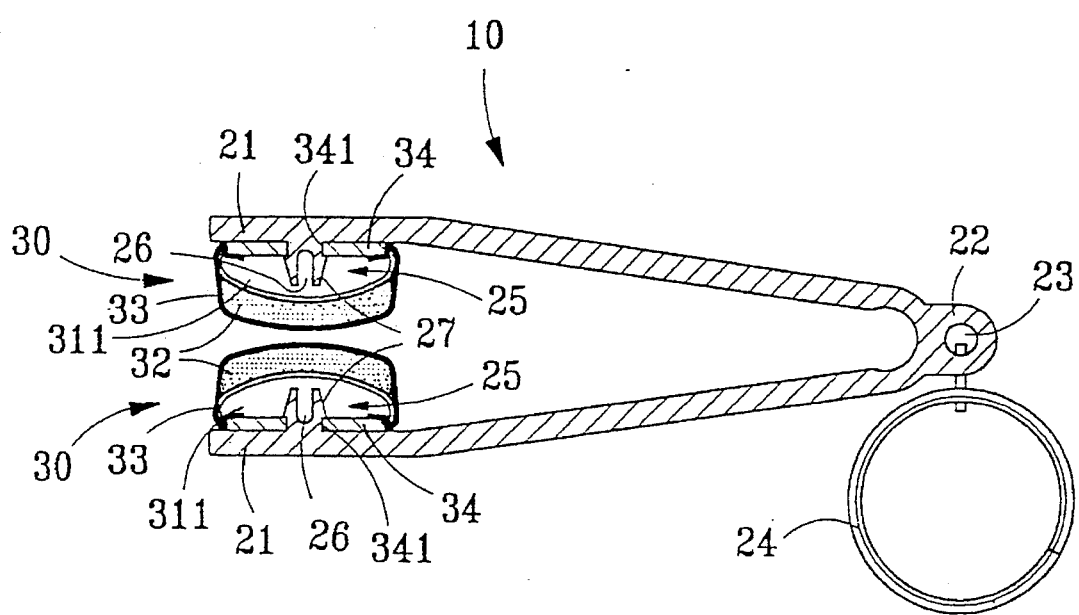
FIG. 3 is a sectional view of the present invention along line 3—3 of FIG. 1.

FIG. 1, 2, 2A and 3 show the present invention of a portable eyeglasses wiper (10). The present invention consists primarily of a pair of tongs (20) and two wiping components (30). The pair of tongs (20) is V- or U-shaped. Its two opening ends may be round heads (21), spherical or of other shapes. Its function is to allow a consumer to hold with his or her fingers. Each round head (21) has a joint (26) in the center of an inner side (25) of the round head (21). The joint (26) has a pair of flanges (27) on both sides and an elastic space longitudinally.

The bending point of the pair of tongs (20) is extended by a loop (22) with a through hole (23). A ring (24) runs through the through hole (23). It enables a consumer to hook the present invention to the strap of a handbag or the belt loop of a pair of pants. The ring can also be used as a key loop to provide convenience to the consumer. The present invention indeed has the feature of being portable.

Each of the two wiping components (30) consists of a shell seat (31), a soft pad (32), a piece of wiping cloth (33) and a fixed disc (34). The shell seat (31) is a disc and has a soft pad (32) (for example, sponge and other soft materials) glued on its closed top. The soft pad (32) is wrapped by a piece of wiping cloth (33) (can be linen, non-woven linen or cotton paper). The excessive edges of the wiping cloth (33) are tucked into the space (311) of the bottom of the shell seat (31). A fixed disc (34) is then put in the space (311). The center of the fixed disc (34) is a rectangular hole (341) to be joined by the joint (26) of the pair of tongs (20). The joint flanges (27) are tucked into the inner wall of the rectangular hole (341) also. It enables the wiping component (30) to attach to the inner and outer surfaces of a pair of eyeglasses or sunglasses to carry out the wiping function. The present invention accomplishes the cleaning function and is portable as well. Therefore, it is more practical.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A portable eyeglasses wiper comprising:

(a) a pair of tongs including two arms with a head on a free end of each said arm, and wherein said arms are connected at ends thereof opposite said free ends to define a junction said heads each including a joint in a center thereof, said joints each comprising a pair of flexible flanges with a space therebetween, and further a tapered upper potion and a lower portion that is smaller in diameter than a middle portion thereof; and (b) a wiping component that is received on a respective one of each of said joints, said wiping components each comprising a shell seat, a soft pad, a piece of wiping cloth, and a fixed disc with an opening in a center thereof;

each said wiping cloth being wrapped around a respective one of said soft pads and secured to an upper surface of a respective one of said shell seats, wherein each said shell seat being affixed to a respective one of said fixed discs by means of a friction fit, the associated wiping cloth ensuring a snug fit, and said opening in said center of each of said fixed discs is received on a respective one of said joints of said heads, said openings and said joints being sized so that said flanges of said joints are slightly compressed as said fixed discs are placed over said joints, said flanges returning to a non-compressed position and securing said fixed discs in place around said lower portions of said joints.

2. The portable eyeglasses wiper as claimed in claim 1 wherein:
a loop extends from the junction of said arms of said tongs, said loop including a through hole therein, said through hole receiving a ring therein, said ring being adapted to be affixed to either a strap of a handbag or a belt loop of a user.

3. The portable eyeglasses wiper as claimed in claim 1 wherein: said tongs are U-shaped.

4. The portable eyeglasses wiper as claimed in claim 1 wherein: said tongs are V-shaped.

5. The portable eyeglasses wiper as claimed in claim 1 wherein: said heads are circular.

* * * * *